US011854170B2

(12) United States Patent
Lv et al.

(10) Patent No.: US 11,854,170 B2
(45) Date of Patent: Dec. 26, 2023

(54) METHOD AND APPARATUS OF PROCESSING IMAGE DISTORTION

(71) Applicants: Beijing BOE Optoelectronics Technology Co., Ltd., Beijing (CN); BOE Technology Group Co., Ltd., Beijing (CN)

(72) Inventors: Yaoyu Lv, Beijing (CN); Yachong Xue, Beijing (CN); Menglei Zhang, Beijing (CN); Xiaolei Liu, Beijing (CN); Lili Chen, Beijing (CN); Hao Zhang, Beijing (CN)

(73) Assignees: Beijing BOE Optoelectronics Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 214 days.

(21) Appl. No.: 17/436,648

(22) PCT Filed: Dec. 24, 2020

(86) PCT No.: PCT/CN2020/139161
§ 371 (c)(1),
(2) Date: Sep. 6, 2021

(87) PCT Pub. No.: WO2022/133953
PCT Pub. Date: Jun. 30, 2022

(65) Prior Publication Data
US 2022/0405895 A1   Dec. 22, 2022

(51) Int. Cl.
*G06T 5/00* (2006.01)
*G06F 3/01* (2006.01)
*G06T 7/70* (2017.01)

(52) U.S. Cl.
CPC .............. *G06T 5/006* (2013.01); *G06F 3/013* (2013.01); *G06T 7/70* (2017.01); *G06T 2207/30201* (2013.01)

(58) Field of Classification Search
CPC . G06T 5/006; G06T 7/70; G06T 2207/30201; G06T 7/73; G06T 2207/10048; G06F 3/013; G06F 3/017
See application file for complete search history.

(56) References Cited

U.S. PATENT DOCUMENTS

| 10,241,545 | B1 * | 3/2019 | Richards | G06F 3/013 |
| 10,922,795 | B2 * | 2/2021 | Sun | G02B 27/0172 |

(Continued)

FOREIGN PATENT DOCUMENTS

| CN | 106527733 A | 3/2017 |
| CN | 108876725 A | 11/2018 |
| CN | 109891296 A | 6/2019 |

*Primary Examiner* — Mihir K Rayan
(74) *Attorney, Agent, or Firm* — IPro, PLLC

(57) ABSTRACT

An image distortion processing method, including: determining a first relationship between a position of a human eye and a viewing position of the human eye on the VR screen; displaying an initially distorted image on the VR screen; determining a first feature point located at a first initial position in the initially distorted image; determining a first human eye position of the human eye in a case of viewing the first feature point located at a first target position; determining the first target position according to the first relationship and the first human eye position; determining a first target distortion parameter corresponding to the first feature point located at the first target position according to a relationship between a position of the feature point on the VR screen and a distortion parameter; and performing distortion on an image displayed on the VR screen according to the first target distortion parameter.

16 Claims, 7 Drawing Sheets

(56) References Cited

U.S. PATENT DOCUMENTS

| | | | |
|---|---|---|---|
| 2007/0035706 A1 | 2/2007 | Margulis | |
| 2013/0169560 A1* | 7/2013 | Cederlund | G06F 3/013 |
| | | | 345/173 |
| 2016/0063303 A1* | 3/2016 | Cheung | G06V 40/193 |
| | | | 382/103 |
| 2016/0091720 A1* | 3/2016 | Stafford | G02B 27/0172 |
| | | | 345/8 |
| 2016/0353094 A1* | 12/2016 | Rougeaux | G06F 3/03547 |
| 2019/0339529 A1* | 11/2019 | Malaika | G06T 5/006 |

* cited by examiner

METHOD AND APPARATUS OF PROCESSING IMAGE DISTORTION

CROSS REFERENCE TO RELATED APPLICATIONS

The present disclosure is US national phase of a PCT international application under PCT/CN2020/139161, entitled "METHOD AND APPARATUS OF PROCESSING IMAGE DISTORTION" and filed on Dec. 24, 2020.

TECHNICAL FIELD

The present disclosure relates to the field of display technology, and in particular, to a method of processing image distortion, an apparatus for processing image distortion, a VR display device, and a computer-readable storage medium.

BACKGROUND

VR display devices are required to guarantee a large field of view to improve user immersion. Currently, it is typical to arrange an optical lens between a viewers eye and a screen to as to generate a virtual image through the optical lens at a long distance for the human eye to view.

However, the optical lens will introduce distortion inevitably, resulting in a certain degree of distortion of an image displayed on the VR screen. For example, in a case that a normal image is displayed on a VR screen, an image with severe pincushion distortion may be seen through the lens. Therefore, the pincushion distortion introduced by the lens may be canceled by performing barrel distortion on the normal image in advance in related technology, and then the normal display image can be seen through the optical lens.

However, the barrel distortion performed on the image displayed on the VR screen is based on a distortion parameter which is a theoretical distortion parameter provided by the optical lens manufacturer. The theoretical distortion parameter is obtained by calculating optical path through an optical software. However, theoretical distortion parameters of various optical lens that are actually manufactured are different. And furthermore, the theoretical distortion parameter only takes the distortion introduced by the optical lens itself into account, and factors such as the VR device in entirety, assembling errors, and etc. are not taken into account. Due to the reasons listed above, performing distortion on the image displayed on the VR screen cannot effectively eliminate the distortion generated by viewing the image by the user through the optical lens.

SUMMARY

In view of this, the embodiments of the present disclosure provide a method of processing image distortion, an apparatus for processing image distortion, a VR display device, and a computer-readable storage medium to solve technical problems in the related art.

According to the first aspect of the embodiments of the present disclosure, a method of processing image distortion is provided, including:

determining a first relationship between a position of a human eye and a viewing position of the human eye on the VR screen;

displaying an initially distorted image on the VR screen;

determining a first feature point located at a first initial position in the initially distorted image;

determining a first human eye position of the human eye in a case of viewing the first feature point located at the first target position;

determining a first target position according to the first relationship and the first human eye position;

determining, according to a relationship between a position of the feature point on the VR screen and a distortion parameter, a first target distortion parameter corresponding to the first feature point at the first target position; and performing distortion on an image displayed on the VR screen according to the first target distortion parameter.

According to the second aspect of the present disclosure, an apparatus for processing image distortion is provided, including one or more processors working individually or cooperatively, and the one or more processors are configured to:

determine a first relationship between a position of a human eye and a viewing position of the human eye on the VR screen;

display an initially distorted image on the VR screen;

determine a first feature point located at a first initial position in the initially distorted image;

determine a first human eye position of the human eye in a case of viewing the first feature point located at the first target position;

determine a first target position according to the first relationship and the first human eye position;

determine, according to a relationship between a position of the feature point on the VR screen and a distortion parameter, a first target distortion parameter corresponding to the first feature point at the first target position; and perform distortion on an image displayed on the VR screen according to the first target distortion parameter.

According to the third aspect of the present disclosure, a VR display device is provided, including:

a VR screen, a lens, and a processor, wherein the processor is configured to implement operations of the method as described above.

According to the fourth aspect of the present disclosure, a computer-readable storage medium is provided, on which a computer program is stored, in a case that the program is executed by a processor, operations of the method as described above are implemented.

According to the embodiments of the present disclosure, the position of the first grid point on the VR screen viewed by the human eye of the user may be adjusted to eliminate the distortion, and thus, the distortion parameter is adjusted. Thereby, it is equivalent to obtain a more reasonable distortion parameter by adjusting the theoretical distortion parameter of the lens. Therefore, distortion is performed subsequently on an image displayed on the VR screen according to the adjusted distortion parameter, so as to more effectively eliminate the distortion caused by viewing the image displayed on the VR screen through the lens.

BRIEF DESCRIPTION OF THE DRAWINGS

In order to more clearly describe the technical solutions according to the embodiments of the present disclosure, the following will briefly introduce the drawings used for the description of the embodiments. Obviously, the drawings in the following description only illustrate some embodiments of the present disclosure. For one of ordinary skill in the art, other drawings can be obtained from these drawings without creative works.

DETAILED DESCRIPTION OF THE EMBODIMENTS

The technical solutions according to embodiments of the present disclosure will be clearly and completely described hereinafter in conjunction with the accompanying drawings of the embodiments of the present disclosure. Obviously, the described embodiments are only a part of the embodiments of the present disclosure, rather than all the embodiments. Based on the embodiments of the present disclosure, all other embodiments obtained by one of ordinary skill in the art without creative work shall fall within the protection scope of the present disclosure.

Figure 1:
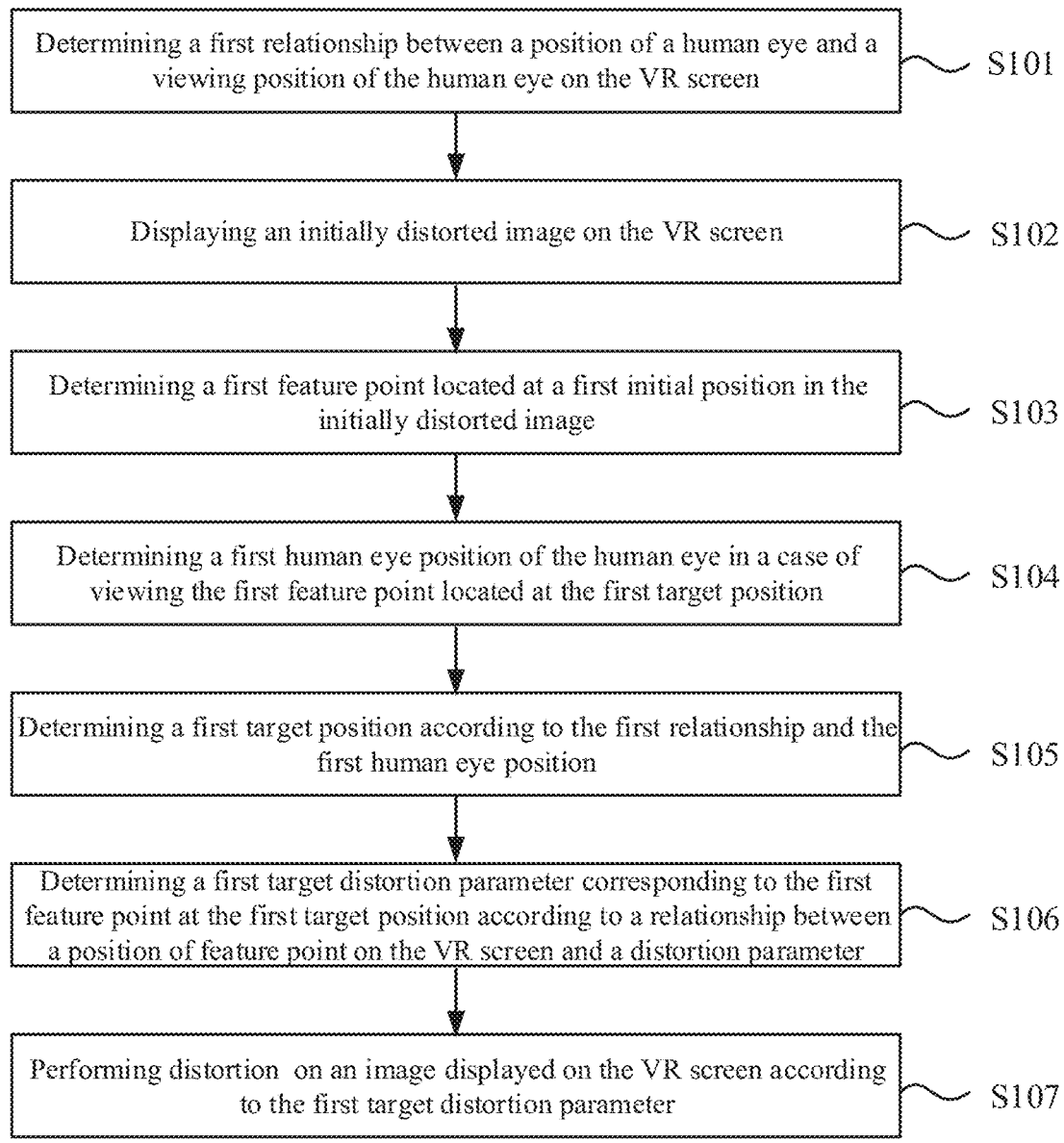
FIG. 1 illustrates a schematic flowchart of a method of processing image distortion according to an embodiment of the present disclosure.

FIG. 1 illustrates a schematic flowchart of a method of processing image distortion according to an embodiment of the present disclosure. The method according to the embodiment may be applicable to a VR (Virtual Reality, virtual reality) display device. A VR screen may be disposed in the VR display device, and a lens can be disposed between the VR screen and a viewer's eyes.

In an embodiment according to the present disclosure, the VR screen may include a left screen for the left eye and a right screen for the right eye. Accordingly, the lens includes a left lens for the left eye and a right lens for the right eye. In this case, various relationships described in the following embodiments may comprise a relationship corresponding to the left eye and a relationship corresponding to the right eye.

As illustrated in FIG. 1, the method of processing image distortion may include the following steps:

In step S101, a first relationship between a position of a human eye and a viewing position of the human eye on the VR screen is determined;

In step S102, an initially distorted image is displayed on the VR screen;

In step S103, a first feature point located at a first initial position in the initially distorted image is determined;

In step S104, a first human eye position of the human eye in a case of viewing the first feature point located at the first target position is determined;

In step S105, a first target position is determined according to the first relationship and the first human eye position;

In step S106, a first target distortion parameter corresponding to the first feature point at the first target position is determined according to a relationship between a position of feature point on the VR screen and a distortion parameter;

In step S107, distortion is performed on an image displayed on the VR screen according to the first target distortion parameter.

In an embodiment of the present disclosure, the first relationship between the position of the human eye and the viewing position of the human eye on the VR screen can be determined first, wherein an image acquisition device, such as an infrared camera, may be provided in the VR display device to collect a human eye image, a pupil region of which corresponds to the position of the human eye. As the position of the human eye varies, a viewing position of the human eye on the VR screen also varies.

For example, the position of the human eye is (x, y) and the viewing position is $(X_G, Y_G)$, the first relationship can be:

$$\begin{cases} X_G = a_0 + a_1 x + a_2 y + a_3 xy + a_4 x^2 + a_5 y^2 + a_6 x^2 y^2 \\ Y_G = b_0 + b_1 x + b_2 y + b_3 xy + b_4 x^2 + b_5 y^2 + b_6 x^2 y^2 \end{cases}.$$

It should be noted that the above formula is only an example of the first relationship, which can be set and adjusted as required.

In an embodiment of the present disclosure, the initially distorted image may be displayed on the VR screen, and the first feature point located at the first initial position may be determined in the initially distorted image. The initially distorted image may be an image in which pixels are distributed under a certain rule, and the first feature point may be pixels with certain features.

For example, the initially distorted image may be an initially distortion grid, and the first feature point may be a first grid point, that is, an intersection of a horizontal line and a vertical line in the initial distortion grid. The initial distortion grid may be determined based on a theoretical distortion parameter of the lens, and the first grid point may be any point in the initial distortion grid.

Figure 2A:
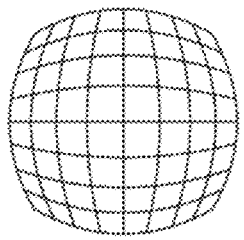
FIG. 2A and FIG. 2B illustrate schematic views of an initial distortion grid and viewing effect according to an embodiment of the present disclosure.
Figure 2B:
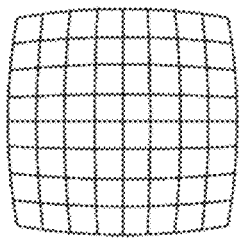

FIGS. 2A and 2B illustrate schematic views of an initial distortion grid and viewing effect according to an embodiment of the present disclosure.

The initial distortion grid may adjust an image displayed on the VR screen according to the theoretical distortion parameter. For example, as illustrated in FIG. 2A, the initial distortion grid exhibits barrel distortion. However, the theoretical distortion parameter is typically obtained by calculating optical paths of the lens through an optical software, and the theoretical distortion parameters of various lens manufactured by actual manufacturing processes are different, and only distortion introduced by the lens itself is taken into account in the theoretical distortion parameter, and factors of the entire VR machine, assembling errors and etc. are not taken into account. Thus, distortion of viewing the image by the user through the lens cannot be eliminated effectively by performing distortion on the image displayed on the VR screen according to the theoretical distortion parameter. Therefore, the initial distortion grid viewed by the human eye through the lens still has some distortion.

For the first grid point of the initial distortion grid, its original position on the VR screen is the first initial position. However, as illustrated in FIG. 2B, since the image seen by the user still has some distortion, the user can adjust his sight to a position at which the user thinks the first grid point should be located in a case of no distortion, that is, the first target position.

In other words, the user may select a first grid point from the initial distortion grid. Since a position of the first grid point in the initial distortion grid still appears to be distorted to the user, the user may change the position of the human eye. Thereby changing the viewing position on the VR screen, the viewing position after change is the first target position (the viewing position before change may be the first initial position), which is a position on the VR screen at which the user thinks the first grid point should be located on the VR screen in a case of no distortion.

Assuming that the position where the first grid point should be located on the VR screen in the case of no distortion is the first target position, the first human eye position in a case of viewing the first grid point at the first target position may be determined, where the first target position is unknown, however, the first human eye position may be obtained by the image acquisition device, and the first relationship between the first human eye position and the first target position has been determined, so the first target position may be determined according to the first relationship and the first human eye position.

Furthermore, according to the relationship between the position of the feature point on the VR screen and the distortion parameter, the first target distortion parameter corresponding to the first feature point at the first target position may be determined, and then the newly determined first target distortion parameter is the distortion parameter of the lens after the human eye changes the viewing position of the first grid point on the VR screen so as to eliminate the distortion. Thus, it is equivalent to obtain a more reasonable first target distortion parameter by adjusting the theoretical distortion parameter of the lens, so that distortion is performed subsequently on an image displayed on the VR screen according to the first target distortion parameter, which can more effectively eliminate the distortion caused by viewing the image displayed on the VR screen through the lens.

Figure 2C:
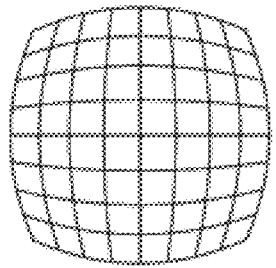
FIG. 2C and FIG. 2D illustrate schematic views of an adjusted distortion grid and viewing effect according to an embodiment of the present disclosure.
Figure 2D:
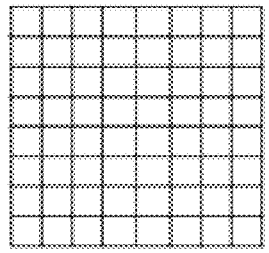

FIG. 2C and FIG. 2D illustrate schematic views of an adjusted distortion grid and viewing effect according to an embodiment of the present disclosure.

According to an embodiment of the present disclosure, as illustrated in FIG. 2C, the initial distortion grid as illustrated in FIG. 2A may be adjusted to a situation illustrated in FIG. 2C. Then, in a case of displaying the distortion grid as illustrated in FIG. 2C on the VR screen, the user may see a grid image as illustrated in FIG. 2D through the lens, which is a grid image with distortion eliminated effectively.

Figure 3:
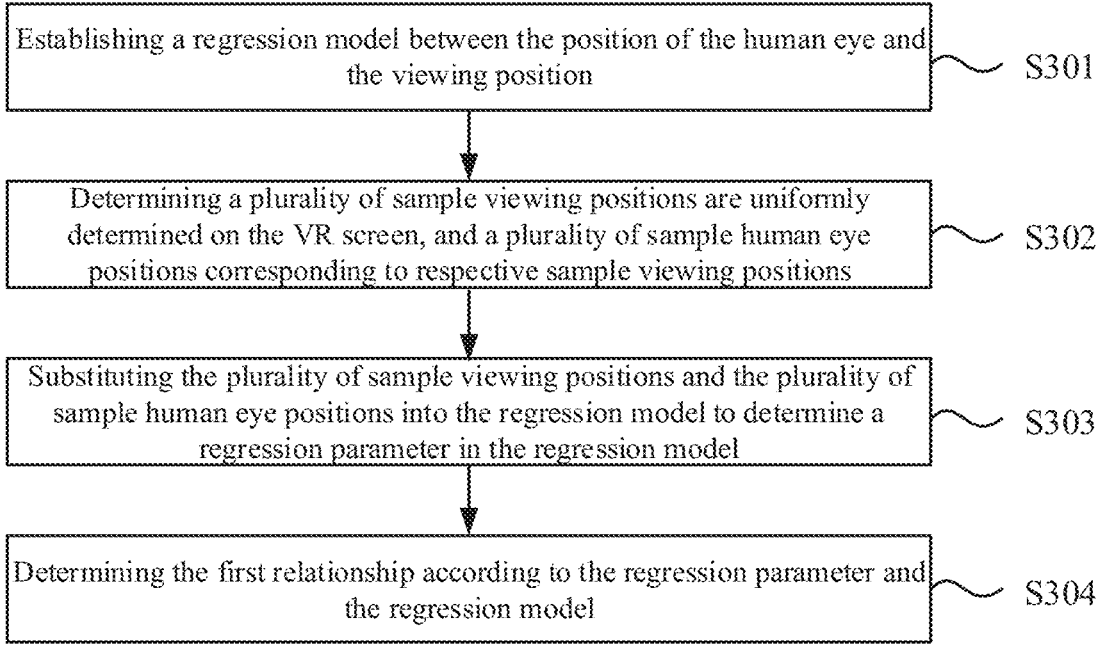
FIG. 3 illustrates a schematic flowchart of a method of processing image distortion according to another embodiment of the present disclosure.

FIG. 3 illustrates a schematic flowchart of a method of processing image distortion according to another embodiment of the present disclosure. As illustrated in FIG. 3, determining the first relationship between the position of the human eye and the viewing position of the human eye on the VR screen includes:

In step S301, a regression model between the position of the human eye and the viewing position is established:

In step S302, a plurality of sample viewing positions are uniformly determined on the VR screen, and a plurality of sample human eye positions corresponding to respective sample viewing positions are determined;

In step S303, the plurality of sample viewing positions and the plurality of sample human eye positions are substituted into the regression model to determine a regression parameter in the regression model;

In step S304, the first relationship is determined according to the regression parameter and the regression model.

In an embodiment of the present disclosure, the human eye position and the viewing position satisfy the first relationship. In order to determine the first relationship, an order of a regression model between the human eye position and the viewing position may be first determined empirically, for example, regarding the above-mentioned equations (x, y) and ($X_G$, $Y_G$), the highest orders of x and y are power of 2.

The regression parameters $a_0$ to $a_6$ and $b_0$ to $b_6$ contained therein are unknown. In order to obtain the regression parameters, a plurality of sample viewing positions may be uniformly determined on the VR screen, and a plurality of sample human eye positions corresponding to respective sample viewing positions may be determined.

It should be noted that a sample viewing positions may be determined on the VR screen first, and then the human eye may view the sample viewing position, and then the human eye position in a case of view the sample viewing position is recorded. Or, a sample human eye position is determined first, and then a sample viewing point on the VR screen by the human eye is determined in a case of viewing at the sample human eye position.

In an embodiment of the present disclosure, the sample viewing positions may be evenly distributed on the VR screen, so as to determine the relationship between the human eye positions and the viewing positions in each region of the VR screen relatively accurately.

For example, the number of sample viewing positions is 5, where a sample viewing position is determined near a center of the VR screen, and a sample viewing position is determined near each of the four corners of the VR screen or the number of sample viewing positions is 9, where a sample viewing position is determined near a center of the VR screen, and a sample viewing position is determined in each of 8 directions of the center of the VR screen: up, down, left, right, top left, top right, bottom left, and bottom right.

Furthermore, the plurality of sample viewing positions and the plurality of sample human eye positions may be substituted into the regression model to determine the regression parameter in the regression model. For example, a multi variate equation set may be obtained, and the regression parameter may be obtained by solving the equation set Finally, the first relationship may be determined according to the obtained regression parameter and the regression model.

Figure 4:
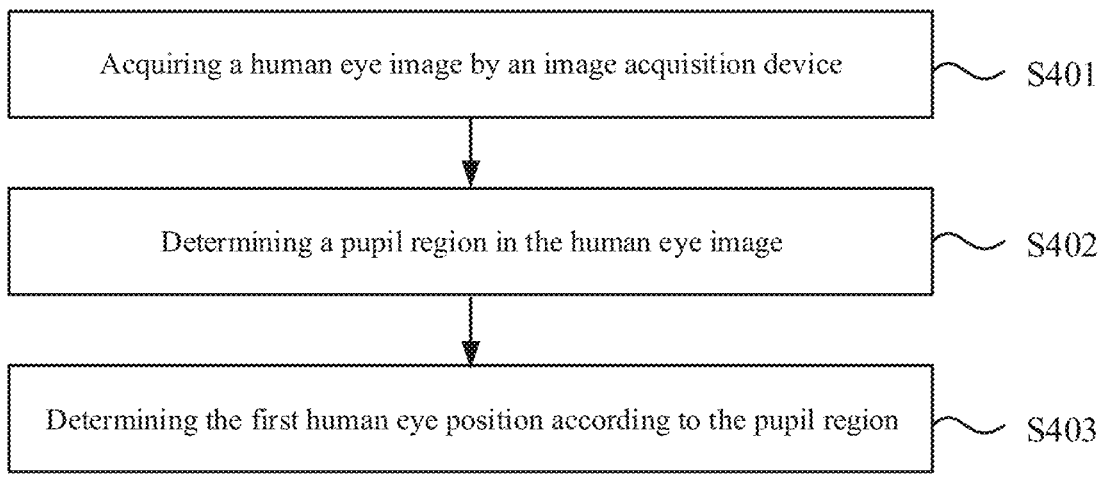
FIG. 4 illustrates a schematic flowchart of a method of processing image distortion according to yet another embodiment of the present disclosure.

FIG. 4 illustrates a schematic flowchart of a method of processing image distortion according to yet another embodiment of the present disclosure. As illustrated in FIG. 4, determining the first human eye position of the human eye in the case of viewing the first feature point located at the first target position includes:

In step S401, a human eye image is acquired by an image acquisition device;

In step S402, a pupil region is determined in the human eye image;

In step S403, the first human eye position is determined according to the pupil region.

In an embodiment of the present disclosure, the image acquisition device may be an infrared camera, and the user's eyes are photographed by the infrared camera, which is not prone to affect the user's viewing.

Figure 5A:
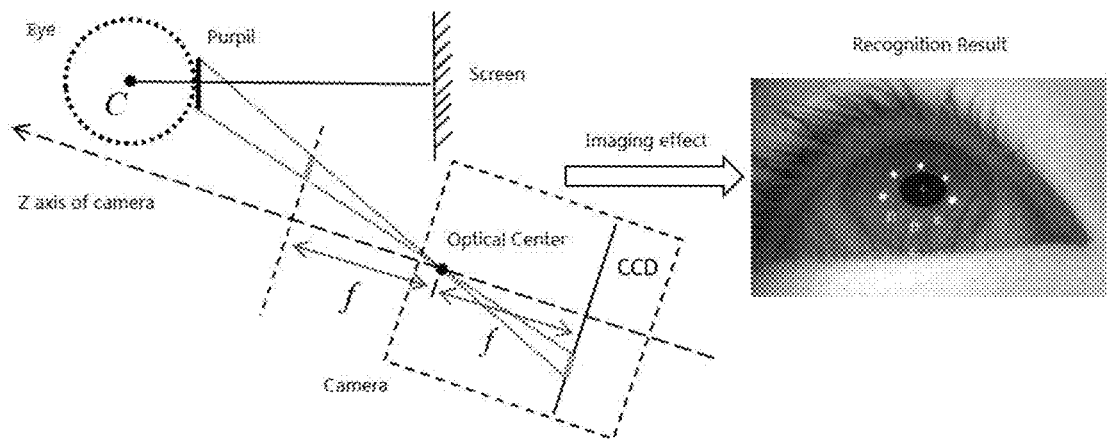
FIG. 5A illustrates a schematic view of determining a first human eye position according to an embodiment of the present disclosure.
Figure 5B:
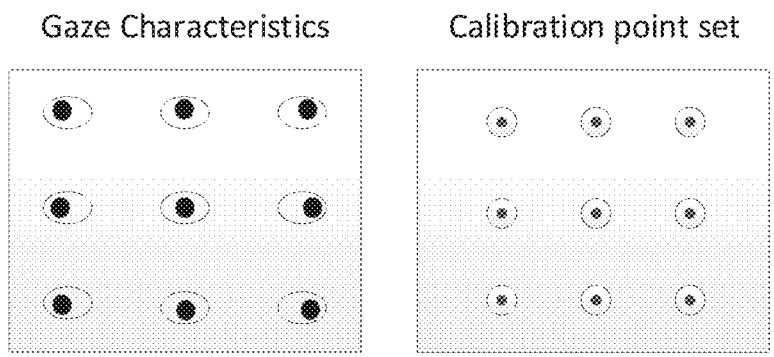
FIG. 5B illustrates a schematic view of a calibration result according to an embodiment of the present disclosure.

FIG. 5A illustrates a schematic view of determining a first human eye position according to an embodiment of the present disclosure. FIG. 5B illustrates a schematic view of a calibration result according to an embodiment of the present disclosure.

In an embodiment of the present disclosure, the captured human eye image may be illustrated on the right side of FIG. 5A. Since a specific viewing direction of the human eye is determined by the pupil, the pupil region can be further determined in the human eye image. This process may be referred to as an EyeTracking calibration, the essence of calibration is to determine a relationship between a gaze characteristics of the pupil (which can be considered as the human eye position) and coordinates of image point on the VR screen that the pupil is viewing, that is, the first relationship between the human eye position and the viewing position. For example, the calibrated first relationship is illustrated in FIG. 5B, the human eye image is illustrated on the left side, and the viewing position of the human eye on the VR screen is illustrated on the right side.

Afterwards, for any human eye image including a pupil, after recognizing a center of the pupil, coordinates of the center of the pupil are substituted into the regression model on the basis of the first correspondence and coordinates of the pixels on the VR screen viewed by the pupil, i.e., the viewing position, may be obtained.

Figure 6:
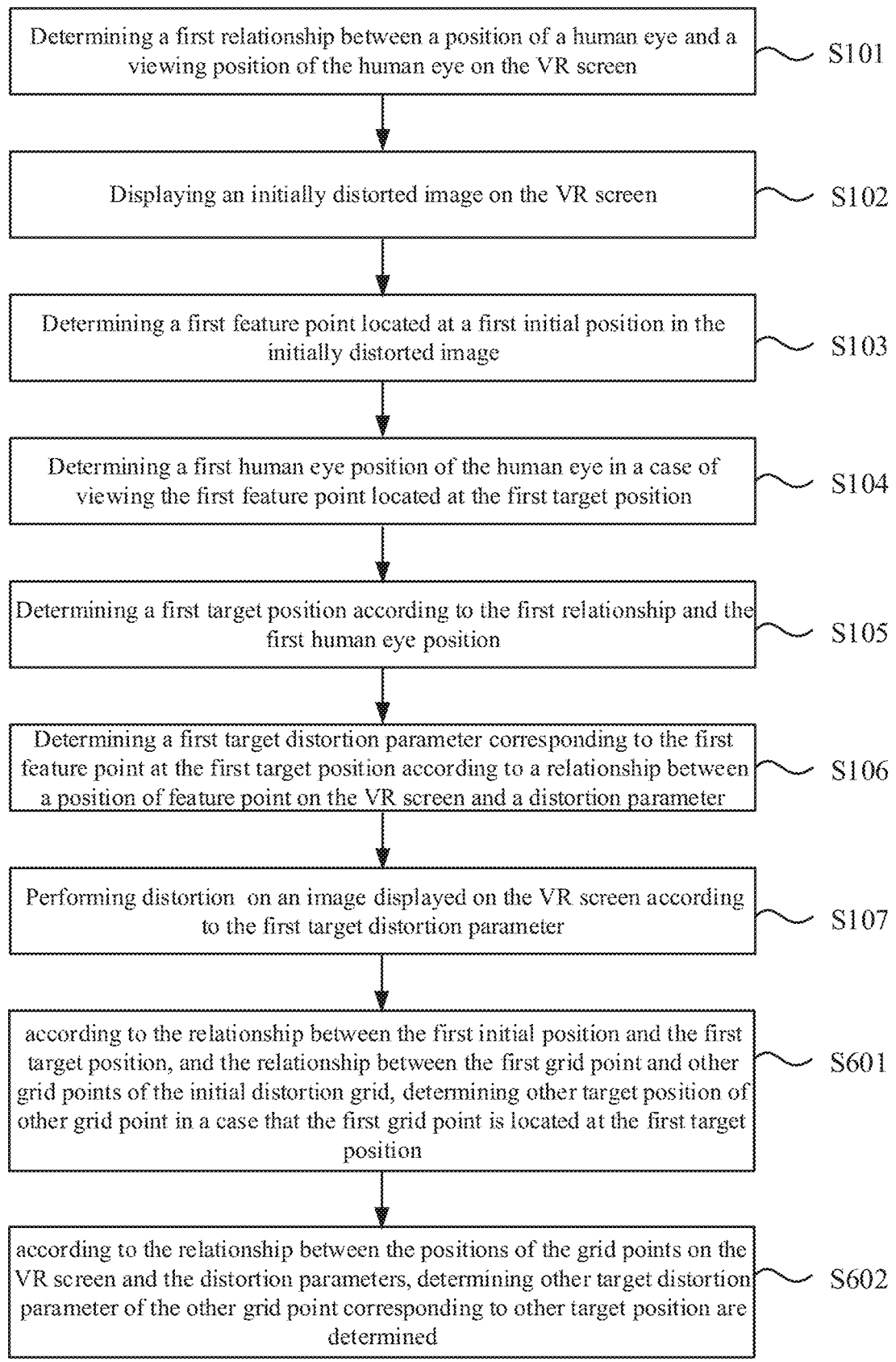
FIG. 6 illustrates a schematic flowchart of a method of processing image distortion according to yet another embodiment of the present disclosure.

FIG. 6 illustrates a schematic flowchart of a method of processing image distortion according to yet another embodiment of the present disclosure. As illustrated in FIG. 6, the method further includes:

In step S601, according to the relationship between the first initial position and the first target position, and the relationship between the first grid point and other grid point of the initial distortion grid, other target position of other grid point is determined in a case that the first grid point is located at the first target position;

In step S602, according to the relationship between the position of the grid point on the VR screen and the distortion parameter, other target distortion parameter of the other grid point corresponding to other target position is determined.

In an embodiment of the present disclosure, after determining the first target distortion parameter corresponding to the first feature point at the first target position, the relationship between the first initial position $(x_1, y_1)$ and the first target position $(x'_1, y'_1)$, for example, an offset of the first target position with respect to the first initial position is, for example, $(\Delta x, \Delta y)$.

Moreover, there is a relationship between the first grid point and other grid point of the initial distortion grid. For example, the initial distortion grid may be divided into 4 quadrants, and the first gird point is located in the first quadrant, if a second initial position of a second grid point in the second quadrant corresponding to the first grid point is $(-x_1, y_1)$, then it can be determined that a second target position corresponding to the second grid point is $(-x_1-\Delta x, y_1+\Delta y)$, which is $(-x'_1, y'_1)$. By analogy, it can be determined that a second target position of the third grid point in the third quadrant corresponding to the first grid point is $(-x'_1, -y'_1)$, and a second target position of the fourth grid point in the fourth quadrant corresponding to the first grid point is $(x'_1, -y'_1)$.

Thus, the user is only required to determine the target position for the grid point in one quadrant, and the target positions of the grid points in all quadrants can be automatically obtained.

In addition, since the relationship between the first grid point and other grid points in the initial distortion grid may be determined, after a position of the first grid point changes from the first initial position to the first target position, a position of other grid point may be changed correspondingly according to the relationship with the first grid point, that is, the user may determine the target position only for one of the first grid points, and a target position of other grid point may be derived by analogy.

In this embodiment, by performing distortion on the image displayed on the VR screen according to the first target distortion parameter, distortion may be performed on the image displayed on the VR screen according to the first target distortion parameter and all other target distortion parameters.

Figure 7:
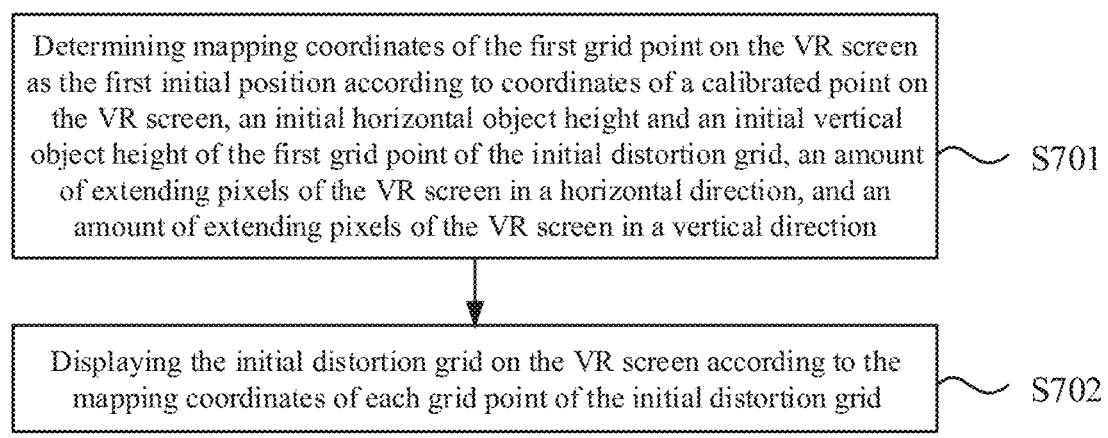
FIG. 7 illustrates a schematic flowchart of a method of processing image distortion according to yet another embodiment of the present disclosure.

FIG. 7 illustrates a schematic flowchart of a method of processing image distortion according to yet another embodiment of the present disclosure. As illustrated in FIG. 7, displaying the initially distorted image on the VR screen includes:

In step S701, mapping coordinates of the first grid point on the VR screen are determined as the first initial position according to coordinates of a calibrated point on the VR screen, an initial horizontal object height and an initial vertical object height of the first grid point of the initial distortion grid, an amount of extending pixels of the VR screen in a horizontal direction, and an amount of extending pixels of the VR screen in a vertical direction; and In step S702, the initial distortion grid is displayed on the VR screen according to the mapping coordinates of each grid point of the initial distortion grid.

In an embodiment of the present disclosure, in a case of displaying the initial distortion grid on the VR screen, the overall parameters of the VR display device can be taken into account, such as an amount of extending pixels of the VR screen in the horizontal direction $Range_x$ and an amount of extending pixels of the VR screen in the vertical direction $Range_y$, then the first grid point is mapped to the VR screen. In such a case, the distortion parameter has not been adjusted yet, so the mapping coordinates are the first initial position, and then each grid point of the initial distortion grid may be mapped to the VR screen in this way, so that the initial distortion grid is displayed on the VR screen. Since the amount of extending pixels of the VR screen in the horizontal direction and the amount of extending pixels of the VR screen in the vertical direction are taken into account, it is beneficial to spread the initial distortion grid to the entire viewing region of the VR screen.

Figure 8:
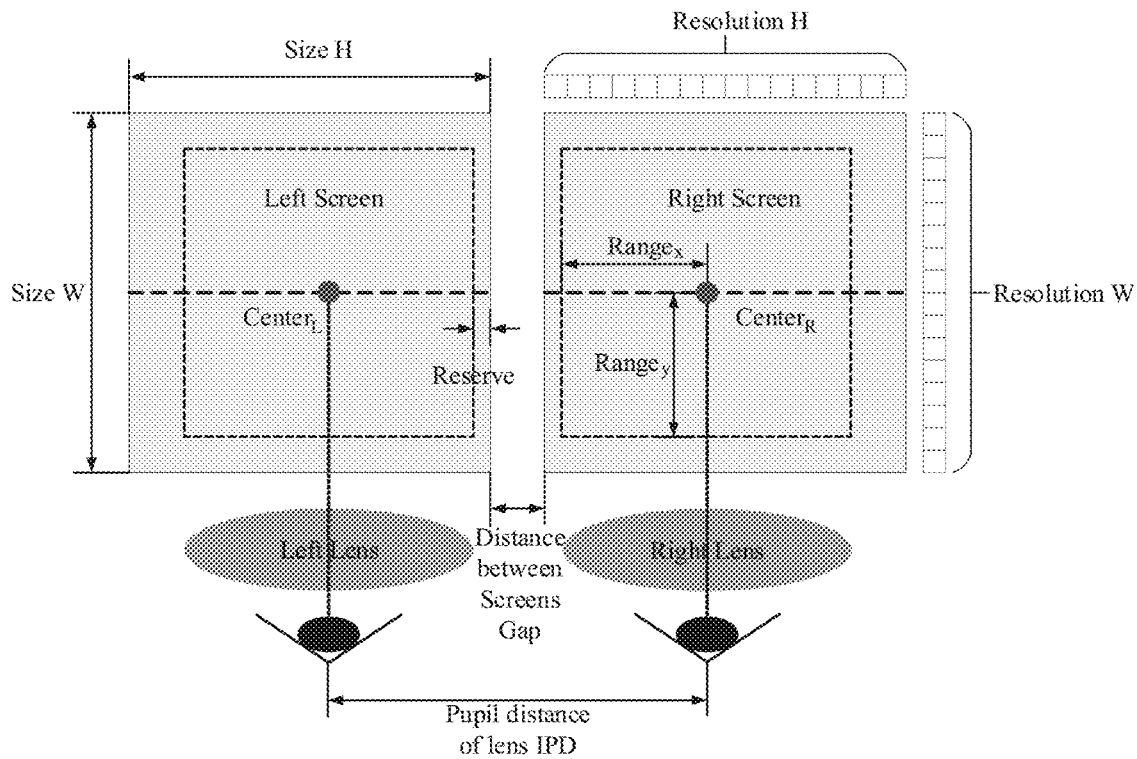
FIG. 8 illustrates a schematic view of viewing a VR screen by a human eye according to an embodiment of the present disclosure.

FIG. 8 illustrates a schematic view of viewing a VR screen by a human eye according to an embodiment of the present disclosure.

As illustrated in FIG. 8, the VR screen includes a left screen and a right screen. The left eye views the left screen through a left lens, and the right eye views the right screen through a right lens. The left screen and right screens have a same shape and a same size, for example, a horizontal size of Size H, a vertical size of Size W, a horizontal resolution of Resolution H, and a vertical resolution of Resolution W.

The calibration point includes a theoretical projection center of the left lens on the left screen $Center_L$ and a theoretical projection center of the right lens on the right screen $Center_R$, wherein the $Center_L$ and the $Center_R$ may be calculated according to the screen parameters Size H, Resolution W, and a gap between the two screens Gap, a pupil distance of lens Ipd, and a distance between centers of adjacent pixels Pitch as follows:

$$\begin{cases} Center_L = \left( \dfrac{2 \cdot Size_H + Gap - Ipd}{2 \cdot Pitch}, \dfrac{Resolution_V}{2} \right) \\ Center_R = \left( Resolution_H - \dfrac{2 \cdot Size_H + Gap - Ipd}{2 \cdot Pitch}, \dfrac{Resolution_V}{2} \right) \end{cases};$$

Since not the entire screen is viewing region for the user, the user can set an amount of reserved pixels Reserve, that is, the number of pixels between a boundary of the viewing region and a boundary of the screen, then the viewing region of the VR screen can be determined according to a projection center and the amount of reserved pixels. For convenience of description, the amount of reserved pixels may be converted to the amount of extending pixels, for example, the amount of extending pixels in the horizontal direction $Range_x$ is equal to the amount of pixels disposed from $Center_L$ to a vertical boundary of the screen minus the amount of reserved pixels in the horizontal direction and the amount of extending pixels in the vertical direction $Range_y$ is equal to the number of pixels disposed from $Center_L$ to a horizontal boundary of the screen minus the amount of reserved pixels in the vertical direction.

Of course, the amounts of reserved pixels Reserve disposed from the $Center_L$ to four respective borders of the screen may be the same or different, and then the calculated $Range_x$ and $Range_y$ may be different. In the embodiment of the present disclosure, the $Range_x$ of the left screen and the $Range_x$ the right screen are made the same, and the $Range_y$ of the left screen and the $Range_y$ of the right screens are also made the same.

Then mapping coordinates of the first grid point on the left screen $Point_L$ and mapping coordinate and $Point_R$ It mapping coordinates in the left screen are respectively:

$$\begin{cases} Point_L = Center_L + \left( \dfrac{r_x}{r_{x-max}} \cdot Range_X, \dfrac{r_y}{r_{y-max}} \cdot Range_Y \right) \\ Point_R = Center_R + \left( \dfrac{r_x}{r_{x-max}} \cdot Range_X, \dfrac{r_y}{r_{y-max}} \cdot Range_Y \right) \end{cases};$$

where, $r_x$ is a horizontal object height of the first grid point, $r_y$ is a vertical object height of the first grid point, $r_{x-max}$ is a maximum horizontal object height of the first grid point, $r_{y-max}$ is a maximum vertical object height of the first grid point, and their calculations will be described in subsequent embodiments.

Figure 9:
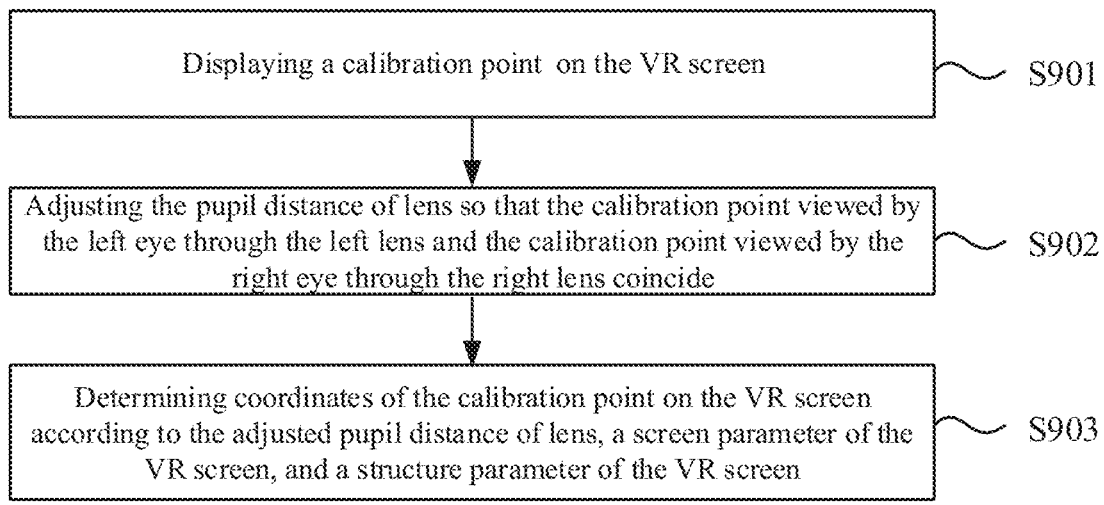
FIG. 9 illustrates a schematic flowchart of a method of processing image distortion according to yet another embodiment of the present disclosure.

FIG. 9 illustrates a schematic flowchart of a method of processing image distortion according to yet another embodiment of the present disclosure. As illustrated in FIG. 9, before determining the mapping coordinates of the first grid point on the VR screen as the first initial position, the method further includes:

In step S901, a calibration point is displayed on the VR screen;

In step S902, the pupil distance of lens is adjusted so that the calibration point viewed by the left eye through the left lens and the calibration point viewed by the right eye through the right lens coincide.

In step S903, coordinates of the calibration point on the VR screen are determined according to the adjusted pupil distance of lens, a screen parameter of the VR screen, and a structure parameter of the VR screen.

In an embodiment of the present disclosure, because the pupil distance of lens is required in the calculation, and for various users, because their pupil distances are different, the required pupil distance of lens will be different. Therefore, the calibration point may be displayed on the VR screen first, and then the user may adjust the pupil distance of lens so that the calibration point viewed by the left eye through the left lens and the calibration point viewed by the right eye through the right lens coincide. Then, the adjusted pupil distance of lens may be suitable to the pupil distance of the user, that is, suitable for the user to view. And furthermore, coordinates of the calibration point on the VR screen may be determined according to the adjusted pupil distance of lens, the screen parameter of the VR screen and the structure parameter of the VR screen, which helps to guarantee the determined coordinates suitable to the pupil distance of the user.

Figure 10:
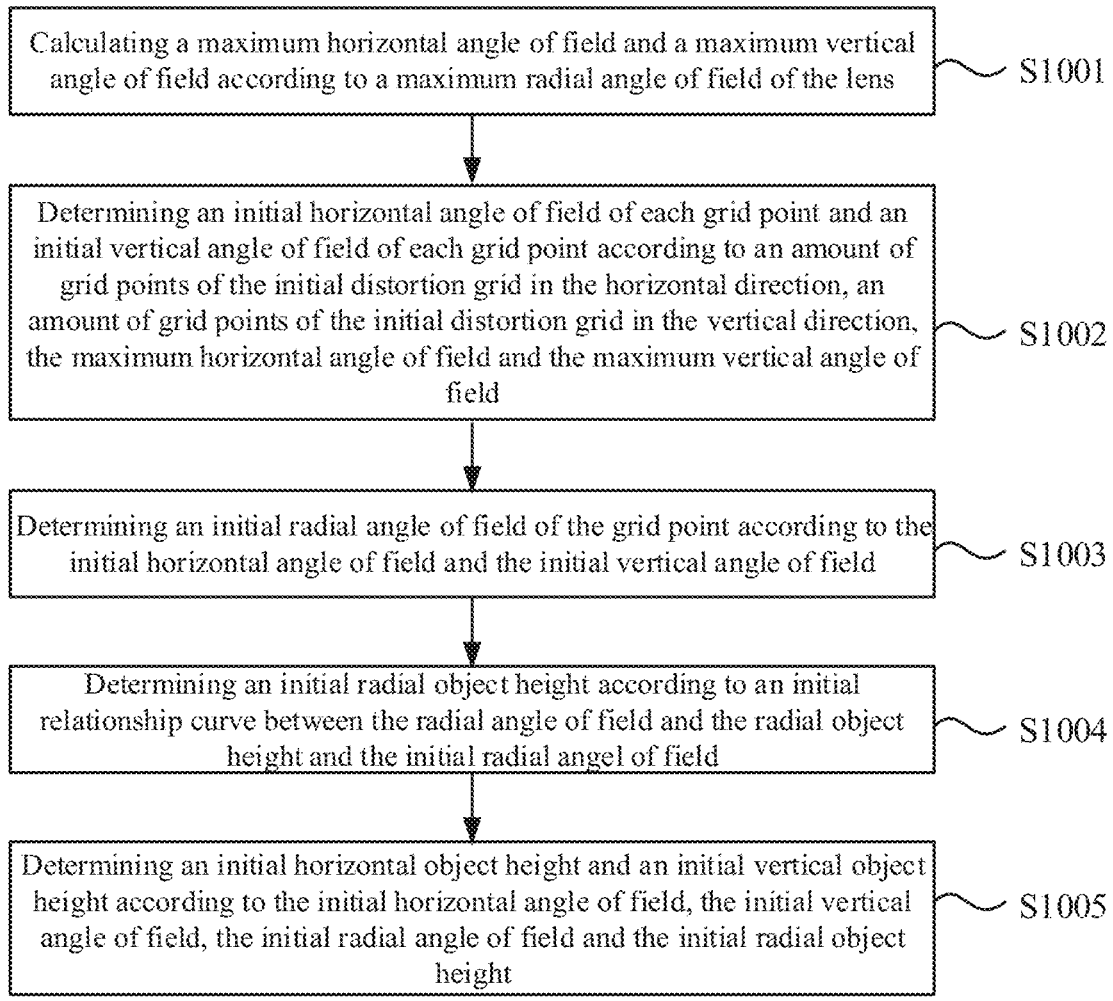
FIG. 10 illustrates a schematic flowchart of a method of processing image distortion according to yet another embodiment of the present disclosure.

FIG. 10 illustrates a schematic flowchart of a method of processing image distortion according to yet another embodiment of the present disclosure. As illustrated in FIG. 10, before determining the mapping coordinates of the first grid point on the VR screen as the first initial position, the method further includes:

In step S1001, a maximum horizontal angle of field and a maximum vertical angle of field are calculated according to a maximum radial angle of field of the lens;

In step S1002, an initial horizontal angle of field of each grid point and an initial vertical angle of field of each grid point are determined according to an amount of grid points of the initial distortion grid in the horizontal direction, an amount of grid points of the initial distortion grid in the vertical direction, the maximum horizontal angle of field and the maximum vertical angle of field.

In step S1003, an initial radial angle of field of the grid point is determined according to the initial horizontal angle of field and the initial vertical angle of field;

In step S1004, an initial radial object height is determined according to an initial relationship curve between the radial angle of field and the radial object height and the initial radial angel of field;

In step S1005, an initial horizontal object height and an initial vertical object height are determined according to the initial horizontal angle of field, the initial vertical angle of field, the initial radial angle of field and the initial radial object height.

Figure 11:
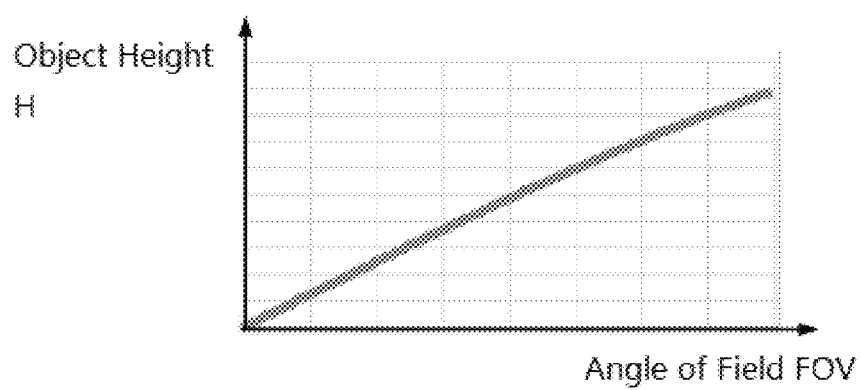
FIG. 11 illustrates a schematic view of an initial relationship curve between object height and angle of field according to an embodiment of the present disclosure.

In an embodiment of the present disclosure, according to the theoretical distortion parameters of lenses provided by the lens manufacturer, a relationship table between the angle of field and the object height can be determined, and then the angel of field and the object height can be fitted (for example, through Gauss-Newton or other non-linear optimization method) to obtain the initial relationship curve between an object height and an angle of field, as illustrated in FIG. 11.

Then the maximum angle of field $fov_{r-max}$, which is the maximum radial angle of field, is selected from the curve, the maximum horizontal angle of field $fov_{x-max}$ and the maximum vertical angle of field $fov_{y\text{-}max}$ may be obtained according to the maximum radial angle of field, for example, by solving the following formula:

$$\begin{cases} \dfrac{fov_{x\text{-}max}}{fov_{y\text{-}max}} = \text{ratio} \\ \left(f \cdot \tan \dfrac{fov_{x\text{-}max}}{2}\right)^2 + \left(f \cdot \tan \dfrac{fov_{y\text{-}max}}{2}\right)^2 = \left(f \cdot \tan \dfrac{fov_{r\text{-}max}}{2}\right)^2 \end{cases} ;$$

where, ratio is a preset value, for example, a ratio of the screen resolution in the x direction to the screen resolution in the y directions, or a ratio of a maximum visual range of the human eye in the horizontal direction to a maximum visual range of the human eye in the vertical direction.

In addition, specs of the initial distortion grid, that is, an amount of grid points in the horizontal direction $n_x$ and an amount of grid points in the horizontal direction $n_y$, can further be set. Then a step length $step_x$ of the angle of field in the horizontal direction and a step length $step_y$ of the angle of field in the vertical direction can be calculated according to the following formula:

$$\begin{cases} step_x = \dfrac{fov_{x\text{-}max}}{n_x} \\ step_y = \dfrac{fov_{y\text{-}max}}{n_y} \end{cases} ;$$

Then for a grid point in the i-th row and j-th column of the initial distortion grid, an horizontal angle of field (in the x direction) $fov_x$ (that is, the initial horizontal angle of field) and a vertical angle of field (in the y direction) $fov_y$ (that is, the initial vertical angle of field) can be calculated according to the following formula:

$$\begin{cases} fov_x = step_x \cdot j \\ fov_y = step_y \cdot i \end{cases} ;$$

Further a radial angle of field $fov^r$ (i.e., the initial radial angle of field) may be calculated according to $fov_x$ and $fov_y$ by solving for example the following formula:

$$\left(f \cdot \tan \dfrac{fov_r}{2}\right)^2 = \left(f \cdot \tan \dfrac{fov_x}{2}\right)^2 + \left(f \cdot \tan \dfrac{fov_y}{2}\right)^2 ;$$

then an initial radial object height r may be obtained by substituting $fov_r$ into the relationship curve $r = F(fov)$ obtained by fitting as described above.

Furthermore, an initial horizontal object height $r_x$ and an initial vertical object height $r_y$ may be obtained according to the initial radial object height r through the following formula:

$$\begin{cases} \dfrac{r_x}{r} = \dfrac{\tan \dfrac{fov_x}{2}}{\tan \dfrac{fov_r}{2}} \\ \dfrac{r_y}{r} = \dfrac{\tan \dfrac{fov_y}{2}}{\tan \dfrac{fov_r}{2}} \end{cases} .$$

In an embodiment of the present disclosure, for example, the first target distortion parameter includes the target horizontal object height and the target vertical object height of the first grid point, then the target horizontal object height of the first grid point and the target vertical object height of the first grid point may be determined according to the coordinates of the calibration point on the VR screen, the target horizontal object height of the first grid point and the target vertical object height of the first grid point in the target distortion grid, and a relationship between the amounts of extending pixels of the VR screen in the horizontal direction and the vertical direction and the mapping coordinates of the first grid point on the VR screen.

That is to say, the target horizontal object height and the target vertical object height of the first grid point may be obtained according to the above formulas related to $Point_L$ and $Point_R$. Specifically, $Point_L$ in the above formula may be set as a first target position on the left screen corresponding to the first human eye position of the left eye, and the $Point_R$ in the above formula is set as a first target position on the right screen corresponding to the first human eye position of the right eye, then $Point_L$ and $Point_R$ in the formula are known, and only rx and ry are unknown. The obtained $r_x$ is the target horizontal object height, and the obtained $r_y$ is the target vertical object height.

Corresponding to the foregoing embodiments of the method of processing image distortion, the present disclosure further proposes embodiments related to an apparatus for processing image distortion.

Embodiments of the present disclosure further provides an apparatus for processing image distortion, which can be applicable to a VR display device in which A VR screen may be provided, and a lens may be provided between the VR screen and a viewer's eye.

In an embodiment of the present disclosure, the VR screen may include a left screen corresponding to a left eye and a right screen corresponding to a right eye. Accordingly, the lens includes a left lens corresponding to the left eye and a right lens corresponding to the right eye. In this case, various relationships described in the following embodiments may include a relationship corresponding to the left eye and a relationship corresponding to the right eye.

The apparatus includes one or more processors working individually or in cooperation, and the one or more processors are configured to:

determine a first relationship between a position of a human eye and a viewing position of the human eye on the VR screen;

display an initially distorted image on the VR screen;

determine a first feature point located at a first initial position in the initially distorted image;

determine a first human eye position of the human eye in a case of viewing the first feature point located at the first target position;

determining the first target position according to the first relationship and the first human eye position;

determine, according to a relationship between a position of the feature point on the VR screen and a distortion parameter, a first target distortion parameter corresponding to the first feature point at the first target position; and perform distortion on an image displayed on the VR screen according to the first target distortion parameter.

In an embodiment of the present disclosure, the initially distorted image is an initial distortion grid, and the first feature point is a first grid point.

In an embodiment of the present disclosure, the one or more processors is further configured to:
  determine other target position where other gird point is located in a case that the first grid point is located at the first target position, according to a relationship between the first initial position and the first target position and a relationship between the first grid point and the other grid point of the initial distortion grid; and
  determine other target distortion parameter of the other grid point corresponding to the other target position according to a relationship between a position of the grid point on the VR screen and the distortion parameter.

In an embodiment of the present disclosure, the one or more processors is configured to:
  determine mapping coordinates of the first grid point on the VR screen as the first initial position according to coordinates of a calibration point on the VR screen, an initial horizontal object height of the first grid point of the initial distortion grid, an initial vertical object height of the first grid point of the initial distortion grid, an amount of extending pixels of the VR screen in the horizontal direction, and an amount of extending pixels of the VR screen in the vertical direction; and
  display the initial distortion grid on the VR screen according to mapping coordinates of each grid point of the initial distortion grid.

In an embodiment of the present disclosure, before determining the mapping coordinates of the first grid point on the VR screen as the first initial position, the one or more processors is further configured to:
  display a calibration point on the VR screen;
  adjust a pupil distance of lens so that the calibration point seen by a left eye through a left lens and the calibration point seen by a right eye through a right lens coincide; and
  determine coordinates of the calibration point on the VR screen according to the adjusted pupil distance of lens, a screen parameter of the VR screen and a structure parameter of the VR screen.

For the apparatus embodiments, as they substantially correspond to the method embodiments, relevant portions may be referred to the portions of the description of the method embodiments. The apparatus embodiments described above are merely illustrative, and the modules described as separate components may or may not be physically separated, and components indicated as modules may or may not be physical modules, that is, they may be located in a place, or they can be distributed to multiple network modules. Some or all of the modules may be selected according to actual requirements to achieve the objects of the solutions of the embodiments. One of ordinary skill in the art can understand and implement without creative work.

The embodiment of the present disclosure further proposes a VR display apparatus, including:
  a VR screen, a lens, and a processor, wherein the processor is configured to implement operations of the method described in any of the foregoing embodiments.

In an embodiment of the present disclosure, the VR display device further includes:
  an image acquisition device, configured to acquire a human eye image, determine a pupil region in the human eye image, and determine a first human eye position according to the pupil region.

The embodiment of the present disclosure further proposes a computer-readable storage medium on which a computer program is stored, characterized in that, in a case that the program is executed by a processor, operations of the method described in any of the foregoing embodiments are implemented.

One of ordinary skill in the art will easily conceives of other embodiments of the present disclosure after considering the specification and practicing the disclosure disclosed herein. The present disclosure is intended to cover any variations, applications, or modifications of the present disclosure. These variations, applications, or modifications follow the general principles of the present disclosure and include common knowledge or conventional technical means in the technical field that are not recorded in the present disclosure. The description and the embodiments are exemplary only, and the true scope and spirit of the present disclosure are defined by the appended claims.

It should be understood that the present disclosure is not limited to the exact structures that have been described above and illustrated in the drawings, and various modifications and changes can be made without departing from its scope. The scope of the present disclosure is only limited by the appended claims.

It should be noted that in the present disclosure, relational terms such as first and second are only used to distinguish one entity or operation from another entity or operation, and do not necessarily require or imply that there is any such actual relationship or order between these entities or operations. The terms "include", "comprise", or any other variants thereof are intended to cover non-exclusive inclusion, so that a process, method, article or device that includes a series of elements includes not only those elements, but also other elements that are not explicitly listed, or further include elements inherent to such processes, methods, articles, or equipment. If there are no more restrictions, the element defined by the sentence "including a . . . " does not exclude presence of other identical elements in the process, method, article, or equipment that includes the element.

The invention claimed is:

1. A method of processing image distortion, comprising:
  determining a first relationship between a position of a human eye and a viewing position of the human eye on the VR screen;
  displaying an initially distorted image on the VR screen;
  determining a first feature point located at a first initial position in the initially distorted image;
  determining a first human eye position of the human eye in a case of viewing the first feature point located at a first target position;
  determining the first target position according to the first relationship and the first human eye position;
  determining a first target distortion parameter corresponding to the first feature point located at the first target position according to a relationship between a position of the feature point on the VR screen and a distortion parameter; and
  performing distortion on an image displayed on the VR screen according to the first target distortion parameter;
  wherein the initially distorted image indicates an initial distortion grid, and the first feature point indicates a first grid point;
  wherein displaying the initially distorted image on the VR screen comprises:
  determining mapping coordinates of the first grid point on the VR screen as the first initial position according to coordinates of a calibration point on the VR screen, an initial horizontal object height of the first grid point of the initial distortion grid and an initial vertical object height of the first grid point of the initial distortion grid, an amount of extending pixels of the VR screen in a horizontal direction and an amount of extending pixels of the VR screen in a vertical direction; and displaying the initial distortion grid on the VR screen according to mapping coordinates of each grid point of the initial distortion grid.

2. The method according to claim 1, wherein determining the first relationship between the position of the human eye and the viewing position of the human eye on the VR screen comprises:

establishing a regression model between the position of the human eye and the viewing position;

determining a plurality of sample viewing positions on the VR screen uniformly, and a plurality of sample human eye positions corresponding to each of the plurality of sample viewing positions;

substituting the plurality of sample viewing positions and a plurality of sample human eye positions into the regression model to determine a regression parameter of the regression model; and determining the first relationship according to the regression parameter and the regression model.

3. The method according to claim 2, wherein an amount of the sample viewing positions is 5 or 9.

4. The method according to claim 1, wherein determining the first human eye position of the human eye in the case of viewing the first feature point located at the first target position comprises:

obtaining a human eye image by an image acquisition device;

determining a pupil region in the human eye image; and determining the first human eye position according to the pupil region.

5. The method according to claim 1, further comprising:

determining a target position where other grid point is located in a case that the first grid point is located at the first target position according to a relationship between the first initial position and the first target position and a relationship between the first grid point and the other grid point of the initial distortion grid, wherein the other grid point indicates a grid point in the initial distortion grid other than the first grid point; and determining a target distortion parameter of the other grid point in a case that the other grid point is located at the target position according to a relationship between a position of the grid point on the VR screen and the distortion parameter.

6. The method according to claim 1, wherein before determining the mapping coordinates of the first grid point on the VR screen as the first initial position, the method further comprises:

displaying a calibration point on the VR screen;

adjusting a pupil distance of lens so that the calibration point seen by a left eye through a left lens and the calibration point seen by a right eye through a right lens coincide; and determining coordinates of the calibration point on the VR screen according to the adjusted pupil distance of lens, a screen parameter of the VR screen and a structural parameter of the VR screen.

7. The method according to claim 1, wherein before determining the mapping coordinates of the first grid point on the VR screen as the first initial position, the method further comprises:

calculating a maximum horizontal angle of field and a maximum vertical angle of field according to a maximum radial angle of field of the lens;

determining an initial horizontal angle of field of each grid point and an initial vertical angle of field of each grid point according to an amount of horizontal grid points of the initial distortion grid, an amount of vertical grid points of the initial distortion grid, the maximum horizontal angle of field, and the maximum vertical angle of field;

determining an initial radial angle of field of the grid point according to the initial horizontal angle of field and the initial vertical angle of field;

determining an initial radial object height according to an initial relationship curve between the radial angle of field and the radial object height and the initial radial angle of field; and determining the initial horizontal object height and the initial vertical object height according to the initial horizontal angle of field, the initial vertical angle of field, the initial radial angle of field, and the initial radial object height.

8. The method according to claim 1, wherein determining the first target distortion parameter corresponding to the first feature point located at the first target position according to the relationship between the position of the feature point on the VR screen and the distortion parameter comprises:

determining a target horizontal object height of the first grid point and a target vertical object height of the first grid point according to the coordinates of the calibration point on the VR screen, the target horizontal object height of the first grid point of the target distortion grid, the target vertical object height of the first grid point of the target distortion grid, a relationship between an amount of extending pixels of the VR screen in the horizontal direction, an amount of extending pixels of the VR screen in the vertical direction, and the mapping coordinates of the first grid point on the VR screen.

9. An apparatus for processing image distortion, comprising one or more processors working individually or cooperatively, wherein the one or more processors are configured to:

determine a first relationship between a position of a human eye and a viewing position of the human eye on the VR screen;

display an initially distorted image on the VR screen;

determine a first feature point located at a first initial position in the initially distorted image;

determine a first human eye position of the human eye in a case of viewing the first feature point located at the first target position;

determine a first target position according to the first relationship and the first human eye position;

determine a first target distortion parameter corresponding to the first feature point at the first target position according to a relationship between a position of the feature point on the VR screen and a distortion parameter; and perform distortion on an image displayed on the VR screen according to the first target distortion parameter;

wherein the initially distorted image indicates an initial distortion grid, and the first feature point indicates a first grid point;

wherein displaying the initially distorted image on the VR screen comprises:

determining mapping coordinates of the first grid point on the VR screen as the first initial position according to coordinates of a calibration point on the VR screen, an initial horizontal object height of the first grid point of the initial distortion grid, an initial vertical object height of the first grid point of the initial distortion grid, an amount of extending pixels of the VR screen in a horizontal direction, and an amount of extending pixels of the VR screen in a vertical direction; and displaying the initial distortion grid on the VR screen according to mapping coordinates of each grid point of the initial distortion grid.

10. The apparatus according to claim 9, wherein the processor is further configured to:

determine a target position of other grid point in a case that the first grid point is located at the first target position according to a relationship between the first initial position and the target position and a relationship between the first grid point and the other grid point of the initial distortion grid, wherein the other grid point indicates a grid point in the initial distortion grid other than the first grid point; and determine a target distortion parameter of the other grid point in a case that the other grid point is located at the target position according to a relationship between a position of the grid point on the VR screen and the distortion parameter.

11. The apparatus according to claim 9, wherein before determining the mapping coordinates of the first grid point on the VR screen as the first initial position, the processor is further configured to:

display a calibration point on the VR screen;

adjust a pupil distance of lens so that the calibration point seen by the left eye through the left lens and the calibration point seen by the right eye through the right lens coincide; and determine coordinates of the calibration point on the VR screen according to the adjusted pupil distance of lens, a screen parameter of the VR screen, and a structural parameter of the VR screen.

12. A VR display device, comprising a VR screen, a lens, and a processor, wherein the processor is configured to implement operations of the method according to claim 1.

13. The VR display device of claim 12, further comprising:

an image acquisition device, configured to acquire a human eye image, to determine a pupil region in the human eye image, and to determine the first human eye position according to the pupil region.

14. A non-transitory computer-readable storage medium with a computer program stored thereon, wherein in a case that the program is executed by a processor, operations of the method according to claim 1 are implemented.

15. A VR display device, comprising a VR screen, a lens, and a processor, wherein the processor is configured to implement operations of the method according to claim 2.

16. A VR display device, comprising a VR screen, a lens, and a processor, wherein the processor is configured to implement operations of the method according to claim 3.

\* \* \* \* \*